Feb. 4, 1969  H. CARL ET AL  3,426,277
METHOD OF DETERMINING THE CURRENT HANDLING
CAPACITY OF A THYRISTOR
Filed April 19, 1965
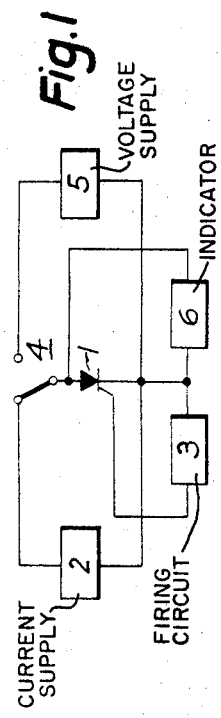
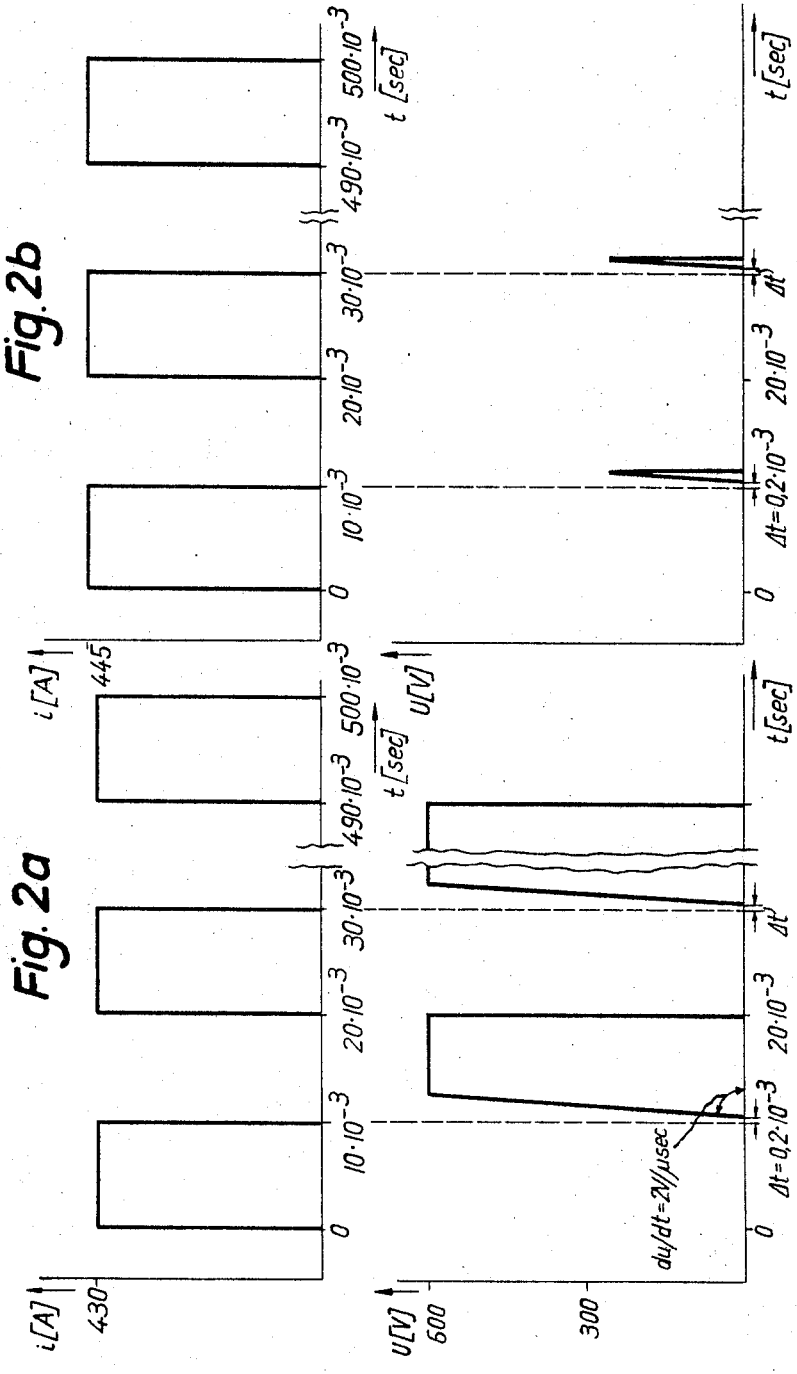
Inventor:
Heinz Carl
August Christian Stumpe
By: Spencer & Kaye
Attorneys United States Patent Office 3,426,277
Patented Feb. 4, 1969

3,426,277
METHOD OF DETERMINING THE CURRENT HANDLING CAPACITY OF A THYRISTOR
Heinz Carl, Obertshausen-Offenbach am Main, and August Christian Stumpe, Frankfurt am Main, Germany, assignors to Licentia Patent-Verwaltungs G.m.b.H., Frankfurt am Main, Germany
Filed Apr. 19, 1965, Ser. No. 449,043
Claims priority, application Germany, Apr. 17, 1964,
L 47,619
U.S. Cl. 324—158       3 Claims
Int. Cl. G01r 19/06

ABSTRACT OF THE DISCLOSURE

A method of determining the current-handling capacity of a thyristor in the forward direction as well as the thermal internal resistance thereof. The method of testing the current handling capacity includes the steps of alternately applying a forward current and a forward blocking voltage to the thyristor and increasing the amplitude of either this current or voltage until the thyristor no longer blocks the voltage. The other current or voltage is held constant. The current-handling capacity of the thyristor is given by the value of the amplitude of the current or voltage which has been increased at the point just prior to the point at which the thyristor no longer blocks the blocking voltage. At all times during the test the peak amplitude of the blocking voltage is maintained below a value which would produce destructive field strengths within the thyristor.

---

The present invention relates to a method for determining the power-handling capacity of a thyristor in forward direction, and to a method for measuring the thermal internal resistance of the thyristor.

A thyristor can be utilized properly only if its power-handling capacity, and more particularly its current-carrying capacity, as well as the thermal internal resistance of the thyristor are known. The thermal internal resistance has to be known in order that information be had concerning the quality of the internal heat flows and to make sure that when the thyristor is used, its dimensioning and the design considerations are such that the pn-junctions will not be subjected to thermal overload. Heretofore, the limits of the current-handling capacity of each thyristor could be determined only by destructive testing. The relative current-handling capacity of individual thyristors was determined by setting predetermined limit values for the permissible junction temperature, the permissible thermal internal resistance and for the permissible pass-through or forward losses, without it being possible to determine anything about the size of the safety factor up to the value at which destruction would take place. For determining the thermal internal resistance, it was up to now therefore necessary to measure the junction temperature and the stud-temperature of the thyristor, together with the losses pertaining thereto. The thermal internal resistance is taken $$R_{i\,th} = \frac{\vartheta_{Sp} - \vartheta_B}{N_v}$$

$R_{i\,th}$ is the thermal internal resistance in degrees centigrade per watt, $\vartheta_{Sp}$ being the junction temperature, $\vartheta_B$ being the stud-temperature of the thyristor, both in degrees centigrade, and $N_v$ being the power loss in the forward direction of the thyristor. For determining the junction temperature $\vartheta_{Sp}$, it was heretofore customary to carry out a calibrating measurement, which was done in this manner: the entire element was brought to the desired calibrating temperature from the outside, and the interrelationship between the forward voltage and a predetermined measuring forward current were recorded at this temperature. Thus, by varying the calibrating temperature, it was possible to obtain the characteristic by utilizing the interrelationship of these values, namely, the calibrating temperature, the forward voltage and the forward current.

If then, a thyristor is made to handle power, there is obtained from the characteristic, on the basis of the forward value, the voltage and the measured current, a given temperature, this temperature being utilized as the junction temperature. In a thyristor, the forward voltage drop is composed of the three individual voltage drops appearing across the three pn-junctions. These three junctions have the same temperature during the calibrating measurements. In load measurements, however, a temperature gradient is formed due to the heat flow in the thyristor, so that during this measurement, the three pn-junctions will have different temperatures. Inasmuch as the characteristic of each pn-junction depends on the temperature, utilizing the forward characteristics of the thyristor by means of the calibrating curve is, in effect, the formation of an average value of the different junction temperatures of the individual pn-junctions. Up to now, it has not been possible to say anything definite about the way in which this average value is formed. Furthermore, the possible temperature distribution within a pn-junction is determined for each pn-junction by taking temperature measurements. This average value formation can, when the barrier layer temperature is measured, lead to appreciable faults, so that a thermal internal resistance calculted on this basis is likewise likely to be in error, and this affords no guarantee that the thyristor will be used to maximum advantage.

It is, therefore, the primary object of the present invention to provide a way in which to overcome the above drawbacks, namely, to provide a way in which the power-handling capacity and internal thermal resistance of a thyristor can be reliably measured without destructively testing the thyristor, and which method is free of the above-discussed drawbacks.

With the above objects in view, the present invention resides in a method of determining the power-handling capacity of a thyristor in the forward direction and resides in the following: after the thyristor has been subjected to a forward current having current pulses of any desired and predetermined wave shape, and after the elapse of a time interval which is greater than the turn off time of the thyristor, a predetermined forward bias is applied and the limits of the current-handling capacity of the thyristor under the test conditions will be considered to have been reached at the instant when this voltage is still just blocked.

For purposes of determining the power-handling capacity of the thyristor, the present invention makes use of the relationship between the breakover voltage and the junction temperature of the centre junction at the most unfavorable point. The thyristor is subjected to a wave shape, in forward direction, made up of one or more current pulses. The junction temperature increases as a result of these current pulses. After the thyristor has thus been subjected to the current flowing in forward direction, for a period of time which is greater than the turn off time of the thyristor, a forward voltage is applied to the thyristor. The slope of the flank of the applied voltage is so selected that the rate at which the voltage increases does not cause the thyristor to fire. Furthermore, the peak value of this voltage is so selected that the maximum field strength which prevails within the thyristor does not bring about any permanent changes in the characteristics of the pn-junctions. For example, the voltage which is applied will be the rated voltage of the thyristor. The power-handling capacity of the thyristor is, under these selected conditions, reached when this applied voltage is no longer blocked, the thyristor having previously been subjected to a current.

The current-handling capacity of the thyristor for steady-state operation is considered to be that when the duration of the load application is so long that a thermal equilibrium has been reached in the thyristor.

When the method according to the present invention is used for quality control purposes, it is not necessary that, with a predetermined voltage value, each thyristor be operated until breakover occurs, but it is fully sufficient if, on the basis of a load by a likewise predetermined current value, no breakover firing has occurred, in which case the thyristor being tested is considered to meet the prescribed standards.

According to a further feature of the present invention, the method can be used for determining the thermal internal resistance $R_{i\,th}$. All that is necessary is that the stud-temperature $\vartheta_B$ be measured, and that measurement of the power-handling capacity be carried out at two different stud-temperatures $\vartheta_{B1}$ and $\vartheta_{B2}$. The limit of the power-handling capacity should be carried out with the same applied voltage in the case of each of the two different stud-temperatures. Here, it can be assumed that the critical temperatures which have been brought about, at which the applied voltage of predetermined value is no longer just blocked, will be the same in both cases and that therefore the critical temperatures can be considered to be equal to the junction temperature.

The equation involving the thermal internal resistance $$R_{i\,th} = \frac{\vartheta_{Sp} - \vartheta_{B1}}{N_{v1}} = \frac{\vartheta_{Sp} - \vartheta_{B2}}{N_{v2}}$$

shows that, by cancelling the junction temperature $\vartheta_{Sp}$ there is obtained the value $$R_{i\,th} = \frac{\vartheta_{B1} - \vartheta_{B2}}{N_{v2} - N_{v1}}$$

so that the thermal internal resistance depends solely on the two stud-temperatures $\vartheta_{B1}$ and $\vartheta_{B2}$, both of which are easily measured, and on the two respective power losses $N_{v1}$ and $N_{v2}$, and that any error which has occurred in determining the junction temperature has no influence on determining the thermal internal resistance.

It will thus be seen that, in accordance with the present invention, there is provided a method of testing the current-handling capacity of a thyristor in forward direction, which method comprises the steps of passing through the thyristor a forward current which is constituted by current pluses of given fixed wave shape, and, after the elapse of a time interval which is longer than the turn off time of the thyristor, applying a forward blocking voltage to the thyristor for determining the limit of the current-handling capacity of the thyristor, which limit is reached when the last-mentioned voltage is still just blocked.

It will be understood that the above description of the present invention is susceptible to various modifications, changes and adaptations, and the same are intended to be comprehended within the meaning and range of equivalents of the appended claims.

The following examples are to illustrate the invention, but do not represent a limitation of the invention.

FIG. 1 shows a basic circuit diagram to determine the power-handling capacity of thyristors;

FIG. 2 is an example indicating the flow of the loading current and the testing voltage.

In FIG. 1 the electrical load of the tested thyristor 1 is split into two circuits. The forward current for charging the test sample 1 is taken from the current supply device 2. The ignition device 3 supplies the ignition impulses for controlling the sample. The voltage supply device 5 applies a positive voltage to the thyristor 1 after the change-over of the circuits by means of the switch 4. The indicator 6 examines and indicates whether this positive voltage is blocked by test sample 1. The test conditions for determining the power-handling capacity can largely be adapted to the cyclical and dead beat load to be expected in actual operation.

In FIG. 2a and FIG. 2b the forward currents are of rectangular shape as it may occur for example with converting direct current into alternating current or with on-off switching of direct currents. After the termination of the forward current a delay $\Delta t$ follows which must be longer than the turn-off time $T_F$ of the test sample. Then the positive voltage $u$ is applied to the test sample with the slope $du/dt$ permissible for the respective case of operation. The peak value $u_{max}$ is within the permissible limits of the type of thyristor so selected that it corresponds to the load to be expected. In many cases there will be used the rated voltage of the thyristor or its periodical peak blocking voltage as the peak value of the testing voltage.

In FIG. 2a is shown, that the power-handling capacity of the test sample is not exceeded, whereas FIG. 2b shows that the load current is so much increased that the voltage will not be blocked any more. This indicates that under the test conditions the thyristor is overloaded. The value of currents and voltages stated in FIG. 2 are typical for the AEG-Type BTY 25 with a rated blocking voltage of 600 volts and a rated direct current of 90 amps. at a load duration of ½ sec.

A load duration of 2 sec. is required to determine the power-handling capacity of the thyristor type BTY 25 at continuous operation.

For checking and sorting purposes, during production, the thyristor can be loaded for 2 sec. with rectangular, currents pulses of 50 c./s. of a mean value of 100 amp. according to the above-mentioned method. The thyristor conforms to the test conditions of the type in question if it then blocks the rated voltage. The thermal internal resistance $R_{i\,th}$ of the above thyristor is a result of the relation $$\frac{\vartheta_{B1} - \vartheta_{B2}}{N_{v2} - N_{v1}}$$

A power loss of 180 w. corresponds to a stud-temperature $\vartheta_{B1}=85°$ C., a power-loss of 330 w. to a stud-temperature $\vartheta_{B2}=55°$ C. Therefore the thermal [1] resistance results in $$R_{i\,th} = \frac{85°\ \text{C.} - 55°\ \text{C.}}{330\ \text{w.} - 180\ \text{w.}} = 0.2°\ \text{C./w.}$$

What is claimed is:

1. A method of non-destructively testing the current-handling capacity of a thyristor in forward direction comprising the steps of:
   (a) applying alternately a forward current and a forward blocking voltage to said thyristor, the peak amplitude of said voltage being maintained at a value such that the maximum field strength which is produced in said thyristor does not cause any permanent changes in the characteristics of said thyristor;
   (b) maintaining constant the amplitude of one of said forward current and forward blocking voltage; and
   (c) increasing the amplitude of the other of said forward current and forward blocking voltage and upon detecting the point at which said voltage is no longer blocked by said thyristor, discontinuing said increasing whereby the current-handling capacity of said thyristor may be determined by the value of said other of said forward current and forward blocking voltage at which said forward blocking voltage is still just blocked.

2. A method of determining the thermal internal resistance of a thyristor, comprising the steps of carrying out the method defined in claim 1 at two different stud-temperatures; and, during the carrying out of each, measuring the respective power loss for enabling the thermal internal resistance of the thyristor to be calculated.

---
[1] Internal.

3. The method defined in claim 2, wherein the thermal internal resistance $R_{i\ th}$ of the thyristor is calculated in accordance with the following formula:

$$R_{i\ th} = \frac{\vartheta_{B1} - \vartheta_{B2}}{N_{v2} - N_{v1}}$$

where $\vartheta_{B1}$ = one of said stud-temperatures,
$\vartheta_{B2}$ = the other of said stud-temperatures,
$N_{v1}$ = the power loss measured while carrying out the method at said one stud-temperature, and
$N_{v2}$ = the power loss measured while carrying out the method at said other stud-temperature.

References Cited

Radiotronics (Smith et al.), vol. 27, No. 2, February 1962, pp. 26–33.

RUDOLPH V. ROLINEC, *Primary Examiner.*

E. L. STOLARUN, *Assistant Examiner.*